United States Patent
Sethuramalingam et al.

(10) Patent No.: US 10,673,716 B1
(45) Date of Patent: Jun. 2, 2020

(54) GRAPH-BASED GENERATION OF DEPENDENCY-ADHERENT EXECUTION PLANS FOR DATA CENTER MIGRATIONS

(71) Applicant: Amazon Technologies, Inc., Seattle, WA (US)

(72) Inventors: Ekanth Sethuramalingam, Milpitas, CA (US); Nagaraju Shiramshetti, Santa Clara, CA (US); Sumeet Talwar, Santa Clara, CA (US); Yupeng Zhang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 15/799,284

(22) Filed: Oct. 31, 2017

(51) Int. Cl.
| G06F 15/173 | (2006.01) |
| H04L 12/26 | (2006.01) |
| G06F 9/455 | (2018.01) |
| H04L 29/08 | (2006.01) |
| H04L 12/24 | (2006.01) |
| G06F 16/901 | (2019.01) |

(52) U.S. Cl.
CPC ............ H04L 43/045 (2013.01); G06F 9/455 (2013.01); G06F 16/9024 (2019.01); H04L 41/046 (2013.01); H04L 43/14 (2013.01); H04L 67/16 (2013.01)

(58) Field of Classification Search
None
See application file for complete search history.

(56) References Cited

U.S. PATENT DOCUMENTS

| 10,372,731 | B1 * | 8/2019 | Avidan | G06F 16/2264 |
| 2007/0172237 | A1 * | 7/2007 | Risbood | H04J 14/0227 398/59 |
| 2011/0213883 | A1 * | 9/2011 | Athey | G06Q 10/06 709/226 |
| 2011/0252403 | A1 * | 10/2011 | Joukov | G06F 9/4856 717/121 |
| 2012/0109844 | A1 * | 5/2012 | Devarakonda | G06Q 10/067 705/348 |
| 2012/0123825 | A1 * | 5/2012 | Biran | G06Q 10/0637 705/7.36 |

(Continued)

OTHER PUBLICATIONS

"AWS Server Migration Service: User Guide," Apr. 11, 2017, 25 pages, Retrieved from the internet: https://docs.aws.amazon.com/server-migration-service/latest/userguide/server-migration-ug.pdf.

*Primary Examiner* — Oleg Survillo
(74) *Attorney, Agent, or Firm* — Nicholson De Vos Webster & Elliott, LLP

(57) ABSTRACT

Techniques for graph-based generation of dependency-adherent execution plans for data center migration are described. One or more agents and/or connectors can be deployed to a first network to collect data that can be used, by a server migration service, to identify resources operating in the first network and dependencies between the resources. A graph of the resources can be constructed and processed to remove any bi-dependencies and cycles from the graph that may exist. The resulting graph can be topologically sorted and used to automatically generate a migration plan for the resources that preserves dependencies between resources so that upon each resource being migrated, its inter-resource dependencies are satisfied.

19 Claims, 12 Drawing Sheets

(56) References Cited

U.S. PATENT DOCUMENTS

| | | | |
|---|---|---|---|
| 2012/0151198 A1* | 6/2012 | Gupta | G06F 9/45558 |
| | | | 713/2 |
| 2014/0208111 A1 | 7/2014 | Brandwine et al. | |
| 2015/0040127 A1 | 2/2015 | Dippenaar et al. | |
| 2015/0324215 A1 | 11/2015 | Borthakur | |
| 2016/0094477 A1* | 3/2016 | Bai | H04L 47/786 |
| | | | 709/226 |
| 2016/0337480 A1* | 11/2016 | Anerousis | G06F 9/45558 |
| 2016/0359705 A1* | 12/2016 | Parandehgheibi | H04L 63/1425 |
| 2016/0380916 A1* | 12/2016 | Gnaneswaran | H04L 47/803 |
| | | | 709/224 |
| 2017/0093640 A1* | 3/2017 | Subramanian | H04L 41/12 |
| 2017/0288941 A1* | 10/2017 | Mathew | H04L 41/042 |
| 2019/0370407 A1* | 12/2019 | Dickie | G06F 16/9024 |

\* cited by examiner

GRAPH REDUCTION PHASE: TOPOLOGICAL SORT 500

DIRECTED GRAPH FURTHER REDUCED TO COLLAPSE CYCLES 404

TOPOLOGICALLY SORTED GRAPH 502

US 10,673,716 B1

GRAPH-BASED GENERATION OF DEPENDENCY-ADHERENT EXECUTION PLANS FOR DATA CENTER MIGRATIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
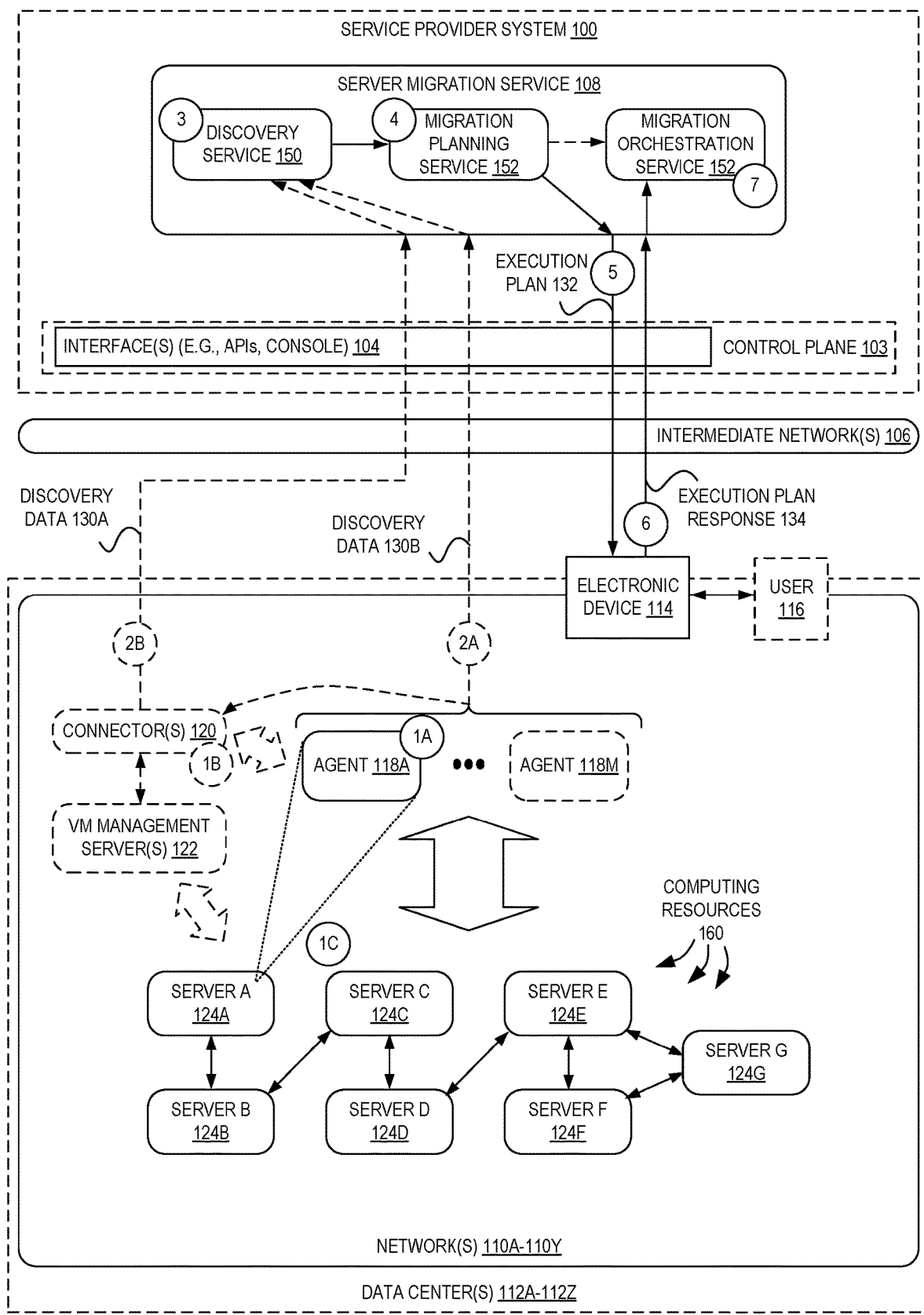
FIG. 1 is a diagram illustrating an environment for graph-based generation of dependency-adherent execution plans for data center migration according to some embodiments.

Various embodiments of methods, apparatus, systems, and non-transitory computer-readable storage media for graph-based generation of dependency-adherent execution plans for data center migration are described. According to some embodiments, a server migration service can automatically discover computing resources (e.g., servers, network infrastructural components, etc.) in a data center or network, discover dependencies between these resources (e.g., inter-dependencies between servers), and generate an execution plan for migrating the computing resources that preserves the discovered dependencies across the data center or network. Accordingly, execution plans can be automatically generated without the time-consuming and difficult planning on the part of a network administrator to identify what resources need to be moved and importantly, how to move them without causing problems.

In recent years, organizations have begun to realize the benefits of moving their computing resources—e.g., applications, servers, data—out of their existing enterprise data centers, which tend to be expensive to maintain and have scalability or resiliency issues. In particular, such entities have turned to service provider systems (also commonly referred to as "cloud computing providers") for information technology services such as Software-as-a-Service (SaaS), Platform-as-a-Service (PaaS), Infrastructure-as-a-Service (IaaS), etc.

Moving computing resources out of an enterprise (or private) network into a service provider's network, however, can be enormously difficult. For example, some organizations may utilize tens, hundreds, or even more servers (e.g., VMs, physical server devices) having a variety of types, configurations, and inter-dependencies. These servers may also be executed in a variety of geographic locations and/or data centers. Moreover, some or all of these servers may need to remain in use throughout the migration or perhaps only tolerate a bare minimum of downtime until being switched over to the new environment. Thus, "manual" migrations involving significant human involvement may not be possible.

Accordingly, embodiments disclosed herein provide graph-based generation of dependency-adherent execution plans for data center migration that can relieve the often substantial burdens currently placed on organizations seeking to migrate their servers. In some embodiments, a customer can deploy one or more detection agents (and/or connectors) within their network that can perform detection operations such as monitoring network traffic, identifying servers, etc., and send discovery data to a server migration service of a service provider system. In some embodiments, the server migration service can discover the existence of the computing resources and discover dependencies (and the types of the dependencies) between the computing resources in the network. In some embodiments, the server migration service can automatically generate an execution plan for performing a migration of the computing resources of the network that ensures that the detected dependencies are not broken. Accordingly, the server migration service can simplify the task of migrating workloads to a cloud-based service provider (or to another network) by identifying some or all resources that power a customer's application—typically a combination of servers, databases, and file shares—and generate migration execution plans that preserve inter-resource dependencies such that each resource, when moved, can successfully access those of the other resources that it depends upon.

The description herein details the graph-based generation of dependency-adherent execution plans for data center migration in many forms. However, it is to be understood that these techniques are not to be limited to pure "data centers" alone, and thus may involve migrating resources from networks, service provider systems, etc., into new locations.

FIG. 1 is a diagram illustrating an environment for graph-based generation of dependency-adherent execution plans for data center migration according to some embodiments. The illustrated environment includes a server migration service 108 that provides client resource discovery and execution plan generation services, and one or more networks 110A-110Y, which could include one or more networks of a first enterprise, one or more networks of a second enterprise, etc. Thus, the networks 110A-110Y may be distributed networks of a same single enterprise while in other embodiments, the networks may be enterprise networks for distinct enterprises or various combinations thereof. The server migration service 108 may operate as part of a service provider system 100, and may comprise one or more software modules executed by one or more electronic devices at one or more data centers and/or geographic locations.

A service provider system 100 provides users with the ability to utilize one or more of a variety of types of computing-related resources such as compute resources (e.g., executing compute instances such as virtual machine (VM) instance and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application-related resources (e.g., databases, application build/deployment services), etc. These and other computing resources may be provided as services, such as a hardware virtualization service that can execute compute instances, a storage virtualization service that can store data objects, etc. To utilize these services, users (or "customers") of service provider systems 100 may utilize one or more user accounts that are associated with a customer account, though these terms may be used somewhat interchangeably depending upon context of use. Users may interact with a service provider system 100 across one or more intermediate networks 106 (e.g., the internet) via one or more interfaces 104, such as through use of application programming interface (API) calls, via a console implemented via a website or application, etc. These interfaces 104 may be part of, or serve as a front-end to, a control plane 102 of the service provider system 100 that includes "backend" services supporting and enabling the services that may be more directly offered to customers.

To provide these and other computing resource services, service provider systems 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system 100 to perform a variety of computing tasks, or may indirectly utilize a compute instance by submitting code to be executed by the service provider system 100, which in turn utilizes a compute instance to execute the code (typically without the user having any control of or knowledge of the underlying compute instance(s) involved).

As indicated above, it has become desirable to move computing resources 160 such as servers (e.g., one or more of servers 124A-124G) out of customer networks 110A-110Y and into another network/system such as service provider system 100 (e.g., to be run as one or more compute instances) for any number of benefits, including increased scalability and/or stability provided by service provider systems 100, reduced management and infrastructure costs, etc.

Components of the disclosed server migration service 108, in some embodiments, allow customers of the service to discover their resources 160 (e.g., enterprise information technology (IT) assets) that may be spread across service provider system 100 and/or on-premises datacenter 112A-112Z environments, record the findings in a database, and keep the database up-to-date with ongoing changes. The service can simplify the task of migrating workloads (e.g., to the service provider system 100 or another network) by identifying all computing resources 160 that power an application—typically a combination of servers (e.g., servers 124A-124G), databases, and file shares—and the inter-dependencies between these resources to produce a complete and dependency-adherent execution plan for migration.

In some embodiments, the server migration service 108 includes a discovery service 150. The discovery service 150, in some embodiments, includes components that implement discovery-specific workflows. For example, the discovery service 150 may collect discovery data 130A-130B from agents 118A-118M installed on behalf of a customer (e.g., instances of the service provider and/or the customer's on-premise hosts) at circle '1A' and/or from one or more connectors 120 installed at circle '1B'. Functionality implemented by the discovery service 150 may include starting/stopping the data collection process for a client, gathering health information for one or more connectors 120 and agents 118A-118M, and/or processing the discovery data 130A-130B to identify computing resources 160 (e.g., servers 124A-124G and/or other infrastructural resources) and the inter-dependencies therebetween.

For example, a console (e.g., interface 104) may be configured to allow customers to sign up for the server migration service 108, monitor the health of the installed components (e.g., connector(s) 120, agents 118A-118M), change configurations of the connector(s) 120, discovery agents 118A-118M and the collection process, download the connector 120 and agents 118A-118M, etc. In some embodiments, a customer may manually install these components, in other embodiments an automated installation may be performed. For example, a console may be provided (e.g., via a user interface of an electronic device 114) to a user 116 (e.g., associated with or working on behalf of a customer) that includes user interface elements which, when selected by a user 116, cause the user's electronic device 114 to download, install, and setup a connector 120 virtual appliance (which may be bundled together with the connector) in an enterprise data center 112A.

The console, in some embodiments, includes user interface elements that allow users 116 to optionally configure the discovery data collection, e.g., to change defaults for what data is captured and the capture frequency. In some embodiments, the console includes user interface elements that allow a user 116 to query, analyze, and/or export the discovery data using the console. In some embodiments, public APIs can be provided (as part of interface(s) 104) to offer similar functionalities.

In some embodiments, the connector(s) 120 support the configuration of the server migration service 108 and may act as an internet gateway for the on-premises discovery agents 118A-118M. In some embodiments (e.g., FIG. 1), the agents 118A-118M gather discovery information and report it back to the discovery service 150 through the connector(s) 120. The connector(s) 120 may be configured with long-term credentials to the discovery service 150, receive discovery data from the agents, and (possibly aggregate) and push the discovery data 130A to the discovery service 150. In various embodiments, however, aggregation may be performed by the agents 118A-118M, by the connector(s) 120, by the discovery service 150.

The connector(s) 120 components may be downloaded to, and operated in, the customer's network environment (e.g., network(s) 110A-110Y) and may responsible for collecting the discovery data. In one example implementation, upon a customer enabling the discovery service 150, the customer is presented (e.g., via the interface(s) 104) with a link to a service provider location for downloading a connector 120. The customer may then install/execute the connector 120 and run it on a virtual machine in the customer's enterprise data center 112A. As one example, a connector 120 could be a FreeBSD VM in Open Virtualization Format (OVA) that can be downloaded from the service provider system 100, and to deploy the connector 120, the customer can install or execute the connector on an electronic device (e.g., a server device), launch the connector as a VM, etc., that has connectivity within a customer network 110A to reach one or more VM management servers 122, one or more agents 118A-118M, the server migration service 108C, etc.

The connector 120 may then act as a local on-premise manager for the discovery service 150. The connector 120 may provide any or all of the following functionalities: authentication of the agents 118A-118M installed on hosts, collection of the discovery data from the agents 118A-118M, aggregation of the discovery data, and transmission of the aggregated discovery data 130A to the discovery service 150, monitoring and reporting of the health of these agents 118A-118M, obtaining encryption keys and providing them to the agents 118A-118M, communicating configuration information to the agents 118A-118M, and/or obtaining identifiers to be assigned to the agents 118A-118M.

In some embodiments, customers may install more than one connector 120 in their on-premise environment (e.g., data center 112A). Each connector 120 may be identified by an identifier generated by the server migration service 108, for example. In some embodiments, the server migration service 108 may send messages to the connector(s) 120 via a message service (e.g., message queuing service) or may "piggy-back" on health messages that the connector(s) 120 may be configured to send.

In some embodiments, the connector(s) 120 may be configured to communicate directly with on-premise infrastructure (e.g., a switch, firewall, router, etc.). For example, a connector 120 may be configured to send requests to, receive data from, and/or monitor a firewall (not illustrated), or the traffic passing through the firewall of client network 130, which may eventually be provided within discovery data 130A to the discovery service 150. As another example, the connector 120 may be configured to interact with one or more VM management servers 122 to obtain information about VMs installed in the network(s) 110A-110Y, including but not limited to VM identifiers and/or types, network addresses, etc., some or all of which may be provided within discovery data 130A to the discovery service 150.

As another source of network-related data, in some embodiments, the network(s) 110A-110Y may be configured to cause physical or virtual switches (or other network nodes) to mirror ports to the connector(s) 120 which thus will provide the capability to identify network protocols, application signatures, generate flow records, and/or deduce network connections between servers using this data, which can be included in the discovery data 130A.

The discovery service 150, in some embodiments, may provide a customer with software agents 118A-118M that can be installed on servers to collect data (e.g., data needed to plan their application migration efforts). Before or after installing the connector(s) 120, customers may download one or more agents to be installed as agents 118A-118M. In embodiments, the agents 118A-118M collect discovery data from a host, and communicate that discovery data to the connector(s) 120, though in other embodiments the agents 118A-118M can directly provide the discovery data 130B back to the discovery service 150 at circle '2A'. For example, agents 118A-118M may be preconfigured with service provider system 100 end points to send the discovery data 130B, and thus the agents 118A-118M may directly communicate with the server migration service 108 (e.g., without the use of a connector 120) in some embodiments.

The agents 118A-118M, in embodiments, can obtain a variety of types of discovery data. For example, the agents 118A-118M may be able to capture information about server workloads and inter-server dependencies, such as inter-process dependencies, operating system (O/S) level monitoring data, information about running applications, etc. Moreover, the agents 118A-118M may be able to directly observe/monitor network traffic or indirectly observe network traffic (e.g., gathering metadata such as NetFlow records or similar types of network flow records) involving the servers 124A-124G. For example, the agents 118A-118M may be configured to directly monitor traffic sent by and/or received by a server or host upon which the agent is installed, and may detect when a server 124A initiates a new connection (e.g., a Transmission Control Protocol (TCP) and the Internet Protocol (IP), or "TCP/IP" connection) with another server or sends data (e.g., via User Datagram Protocol (UDP) without any associated request made on the part (for the data) by the recipient.

The agents 118A-118M, in some embodiments, can be installed on on-premise hosts or compute instances (e.g., in the network(s) 110A-110Y, the service provider system 100, or another system). The agents 118A-118M may be configured to operate in various environments, for example, using one or more types of operating systems (e.g., Windows, Unix, Linux, etc.).

Accordingly, the agents 118A-118M and/or connector(s) 120 may be utilized alone or in combination to gather a variety of types of data to be included as discovery data 130A-130B that is sent to the server migration service 108. For example, one or more of the following types of data may be gathered: server hostnames; network addresses; media access control (MAC) addresses; central processing unit (CPU), network, memory, and/or disk resource allocations; DNS servers that are used; names of installed applications from servers; a list of installed business applications from web/application containers; a list of actively running processes from servers; time series performance metrics; CPU usage; memory usage; network throughput; network latency observed; disk usage; established network TCP connections and/or UDP transmissions and/or receipts; network ports that servers are listening on (and perhaps an identifier of the listening process); etc.

With a collection of discovery data 130A-130B, the discovery service 150 at circle '3' may store and analyze the discovery data 130A-130B to identify the computing resources of the network(s) 110A-110Y and the inter-dependencies between these computing resources.

For example, the depicted discovery service 150 may analyze discovery data 130A-130 that has been stored in a data store to identify installed software packages, running system and application processes, network dependencies of these applications, etc. To discover computing resources, the discovery service 150 may seek to identify installed applications on servers, server hostnames, infrastructural resources such as DNS servers, dynamic host configuration protocol (DHCP) servers, etc. As another example, to discover inter-dependencies between these resources, the discovery service 150 may identify flows between the computing resources from the reported network-related data, which resources initiated these flows, whether there are firewall rules configured between resources (e.g., a whitelisted entry between a first server and a second server over a particular port), etc. Thus, the discovery service 150 may discover network communications between applications and identify network infrastructure dependencies for discovered applications in an enterprise datacenter or on compute instances of a service provider system.

The detected computing resources and dependency information may be provided to a migration planning service 152 of the server migration service 108 which, at circle '4', determines an execution plan that identifies how the computing resources can be migrated over one or more phases in a manner that maintains dependencies throughout the process. The determination of the execution plan, in some embodiments, includes a series of graph data structure operations (e.g., creation, reduction, sorting) as described herein with regard to FIGS. 2-8, ultimately resulting in a generation of an execution plan. The execution plan identifies phases of a migration, where each phase identifies one or more resources to be migrated. The set of phases and arrangement of the associated resources therein is constructed such that a migration performed that adheres to the phases—i.e., moves those resources in each phase together, and each phase in order—results in a migration that avoids dependency violations that would cause problems or disruptions involving the resources.

In some embodiments, the execution plan 132 may be directly provided from the migration planning service 152 to a migration orchestration service 152 to cause the migration to be performed according to the execution plan. However, as illustrated in FIG. 1 at circle '5', in some embodiments the server migration service 108 may send the execution plan 132 to an electronic device 114 of a user 116. The user 116 may view the execution plan 132 recommendation, and cause the electronic device 114 to send back an execution plan response 134.

The execution plan response 134 may indicate that the user 116 approves of the execution plan 132, and thus the response 134 acts as a request to perform the migration as laid out by the execution plan 132. However, in some embodiments the user 116 may modify the execution plan 132. For example, a user 116 may want to remove some resources from being (initially) migrated, such as when the customer desires to migrate the resources of one organizational department, and perhaps later (as part of a different migration) migrate the resources of another organizational department. As another example, it is possible that the user 116 may want to remove certain resources from being migrated, etc. Thus, the execution plan response 134 may include a modified execution plan 132, which may be validated by the server migration service 108 to determine whether it is valid (e.g., does not introduce problems such as dependency violations, does not include invalid resource identifiers, etc.).

In some embodiments, the execution plan response 134 further includes a schedule identifier that indicates when the migration is to be performed (e.g., one or more of a start time, a start date, an end time, an end date), how long the migration may maximally take to complete (e.g., a number of hours, a number of days), or other timing or scheduling related constraints or preferences.

The execution plan response 134 can be provided, at circle '7', to a migration orchestration service 154. In some embodiments, the migration orchestration service 154 calls into a set of execution services such as a disk replication component (e.g., block-based or file-based replication), a virtual machine import component, a database replication component, etc., which may carry out the execution plan to perform the migration (e.g., into the service provider system 100 or into another service provider system or network). As one example, a migration of a resource could include sending a request to the connector 120 and/or an agent 118A to create a snapshot of a resource, upload the snapshot of the resource to the service provider system 100, and thereafter the service provider system 100 could utilize the snapshot to cause the resource to be replicated within the service provider system 100 (e.g., by creating an image of a resource from the snapshot, "launching" the image, etc.). In some embodiments, during the migration or when migration is complete, a migration validation service may validate the migration to ensure that all necessary resources, as indicated by the execution plan, have been successfully migrated.

Figure 2:
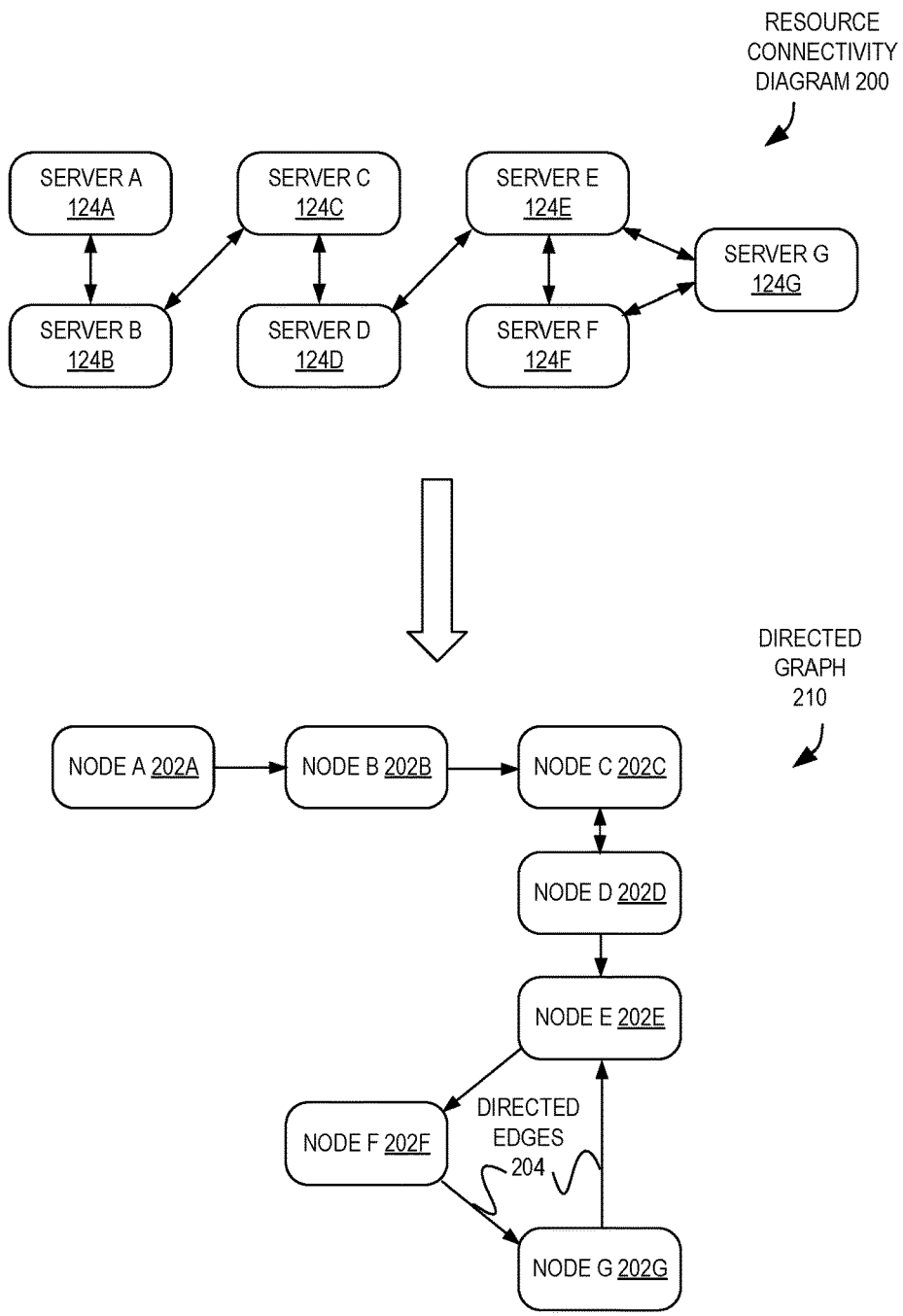
FIG. 2 is a diagram illustrating a generation of a directed graph for graph-based generation of dependency-adherent execution plans for data center migration according to some embodiments.

For further explanation of execution plan auto-generation, we turn to FIG. 2, which is a diagram illustrating a generation of a directed graph for graph-based generation of dependency-adherent execution plans for data center migration according to some embodiments. As indicated above, after discovery of computing resources and their associated inter-dependencies by the discovery service 150, the migration planning service 152 can perform graph data structure operations to identify a set of ordered migration operations that adheres to the discovered dependencies to allow for a non-problematic migration of the resources.

For example, an exemplary resource connectivity diagram 200 (mirroring the depiction of FIG. 1) is shown that includes a plurality of servers 124A-124G with arrows indicating detected communications between each corresponding pair of servers. Note that the arrows in this diagram 200 are not meant to be directed or imply any directionality or dependencies—instead they represent which pairs of the servers 124A-124G communicate with each other in the course of operation. Additionally, although in this simplified example only servers 124A-124G are included in the set of resources to be migrated, it is to be understood that various migrations can be performed involving other types and/or numbers of resources.

As indicated above, using the discovery data 130A-130B, the existence of computing resources (e.g., servers 124A-124G) and also dependencies between the computing resources can be detected by the discovery service 150. For example, portions of discovery data 130A-130B may indicate that a first server, on one or more occasions, initiates a communication (e.g., a session, connection, one-time transmission) with a second server. The discovery data 130A-130B allowing for this discovery could have been identified in a variety of ways as described previously herein, such as via one or more agents 118A-118M and/or connector(s) 120 directly or indirectly monitoring network traffic (e.g., traffic sent to/from servers, which may or may not actually traverse a network, such as when a source and a destination are on a same physical host), inspecting firewall rules, inspecting system or network logs, obtaining VM-related information from one or more VM management servers, etc.

With the discovered computing resources and dependencies, the migration planning service 152 can generate a directed graph 210 data structure. As used herein, the term "graph" may be used generally to refer to a graph data structure, which can be of a variety of formats or representations known to those of skill in the art (e.g., an adjacency list or adjacency matrix), though which typically include one or more nodes (or vertices) and one or more edges, each connecting a pair of nodes. A graph may be a directed graph (or "digraph"), meaning that the edges have a direction associated with them—e.g., a directed edge may point from a first node to a second node. Directed graphs differ from an ordinary or undirected graph, in that undirected graphs are defined in terms of unordered pairs of vertices.

As shown in the directed graph 210, each of the servers 124A-124G is represented by a corresponding node 202A-202G in the directed graph 210. The nodes 202A-202G are connected using directed edges (e.g., directed edges 204F) that indicate dependencies between the servers that the nodes (connected by a directed edge) represent.

For example, node 'A' 202A is connected to node 'B' 202B with a directed edge that points from node 'A' 202A to node 'B' 202B. This configuration indicates that server 'A' 124A depends upon the existence of server 'B' 124B, as indicated by the analysis of the discovery data 130A-130B. For example, an agent may detect that server 'A' 124A periodically or occasionally opens a communication session (e.g., a TCP/IP connection) with server 'B' 124B, though server 'B' 124B does not similarly initiate any communication sessions with server 'A' 124A. As another example, an agent or connector may detect that a firewall rule exists that allows (or whitelists) a communication initiated by server 'A' 124A that is directed to server 'B' 124B, and may similarly detect that no such firewall rule exists in the opposite direction (and thus may be blocked by a default rule of the firewall). Thus, this one-way dependency is modeled in the directed graph 210 using a unidirected (or "one-way") edge pointing from node 'A' 202A to node 'B' 202B.

Similarly, the directed graph 210 indicates that node 'B' 202B is dependent upon node 'C' 202C through use of another unidirected edge pointing from node 'B' 202B to node 'C' 202C.

The directed graph 210 also illustrates a bidirectional (or "two-way") edge between node 'C' 202C and node 'D' 202D. This bidirectional edge indicates that the servers corresponding to these nodes—i.e., server 'C' 124C and server 'D' 124D—have been detected as being bi-dependent (or co-dependent) upon each other. For example, an agent may detect that server 'C' 124A periodically or occasionally opens a communication session (e.g., a TCP/IP connection) with server 'D' 124D, and likewise, server 'D' 124D may also similarly initiate a communication session with server 'C' 124C.

The directed graph 210 also includes a set of directed edges 204 between node 'E' 202E, node 'F' 202F, and node 'G' 202G such that a one-way loop—or "cycle"—is formed. This cycle indicates that server 'E' 124E is dependent upon the existence of server 'F' 124F, which in turn is dependent upon the existence of server 'G' 124G, which in turn is dependent upon the existence of server 'E' 124E.

Figure 3:
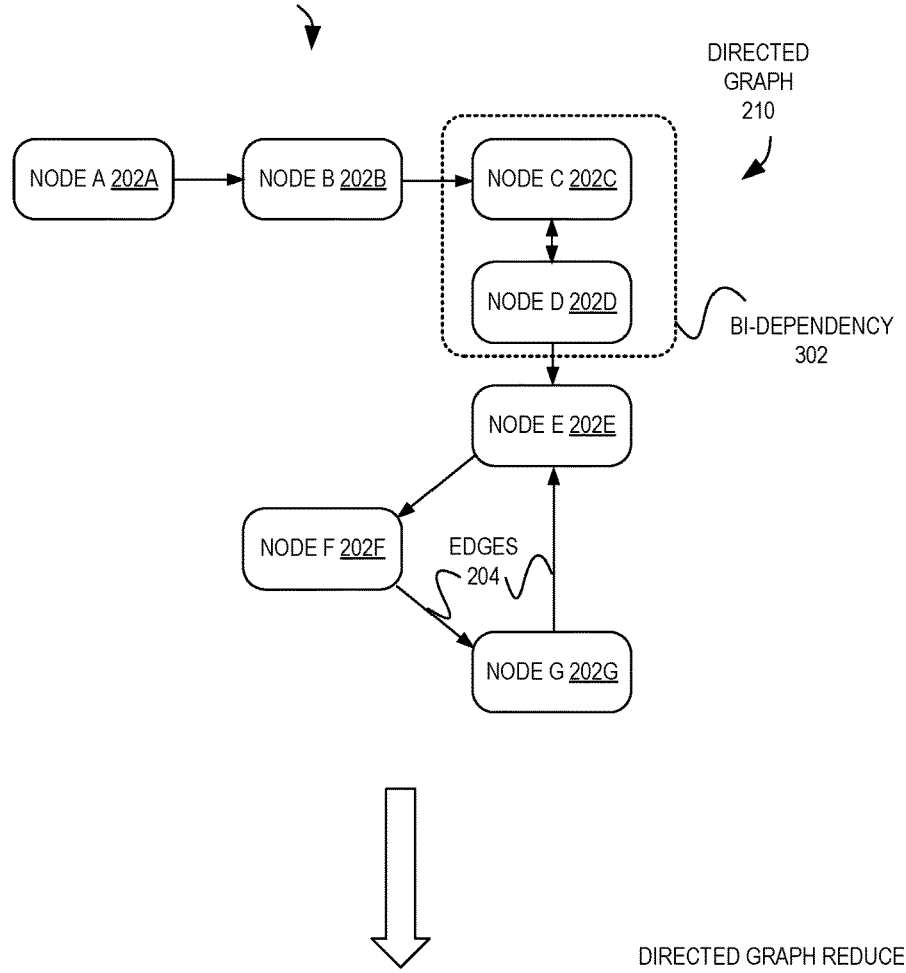
FIG. 3 is a diagram illustrating graph reduction including bi-dependency replacement for graph-based generation of dependency-adherent execution plans for data center migration according to some embodiments.
Figure 3:
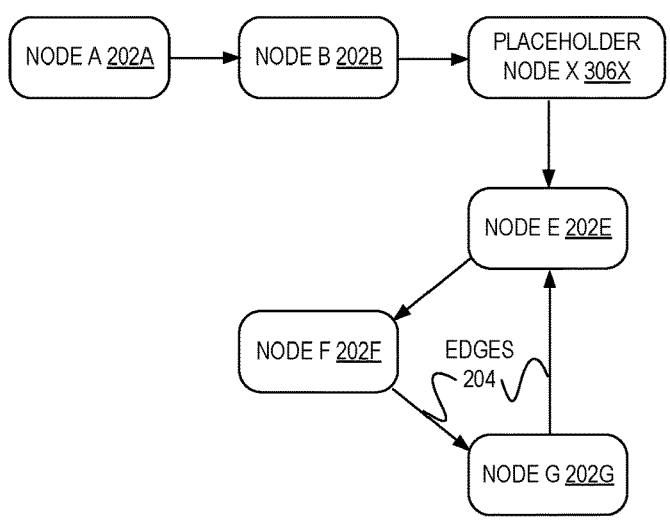

The migration planning service 152 may thus generate a data structure representing this directed graph 210, and continue by performing further operations upon the directed graph 210 as shown in FIG. 3. FIG. 3 is a diagram illustrating graph reduction operations including bi-dependency replacement 300 for graph-based generation of dependency-adherent execution plans for data center migration according to some embodiments.

Using the constructed directed graph 210, the migration planning service 152 in some embodiments detects and eliminates bi-dependencies 302. As described herein, a bi-dependency (represented herein with a two-way or bidirectional edge) between two nodes indicates that the corresponding servers (e.g., servers 124C-124D) are bi-dependent upon each other. Thus, if only one of these servers were to be deployed before the other, the first deployed server may not be able to properly function due to its need to communicate with the other, not-yet deployed server.

Accordingly, in some embodiments, such bi-dependent pairs of servers can be detected and coordinated, in an eventual execution plan for migration, to be migrated together at a same time or during a same phase.

Accordingly, in some embodiments, the migration planning service 152 steps through the directed graph 210 one node at time, following the path created by following edges according to their direction. Upon reaching an edge that is bi-directional (e.g., is identified as being bidirectional via a property of the edge representation), the corresponding nodes that are connected by the bi-directional edge (as well as the actual bi-directional edge itself) can be replaced by a placeholder node.

For example, in the directed graph 210, the migration planning service 152 may start at node 'A' 202A, follow the directed edge to node 'B' 202B, follow the directed edge to node 'C' 202C, and then detect that the next directed edge (between node 'C' 202C and node 'D' 202D) is bidirectional and thus, that a bi-dependency (of the associated servers) exists. Thus, the migration planning service 152 can replace node 'C' 202C and node 'D' 202D and the bidirectional edge therebetween with a placeholder node 'X' 306X, as shown in the directed graph 304 reduced to collapse bi-dependencies at the bottom of FIG. 3.

Upon making the replacement, the migration planning service 152 may continue stepping through the graph until all edges have been traversed and/or all nodes have been visited and thus, all bi-dependencies have been reduced via replacement. In this case, the walk-through will terminate upon completing stepping through nodes 'E'-'G' 202E-202G, as all nodes and edges have been visited.

Figure 4:
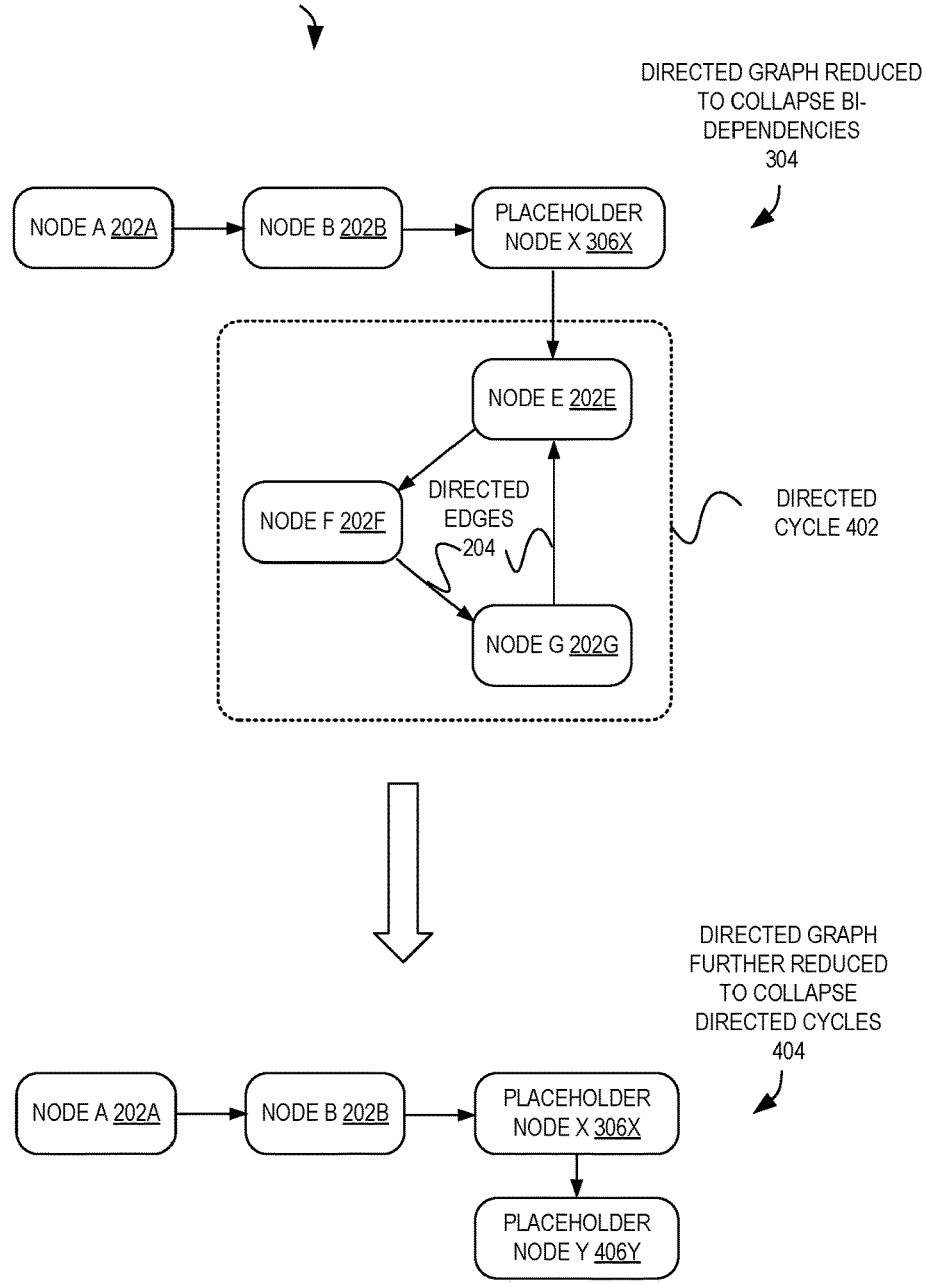
FIG. 4 is a diagram illustrating graph reduction including cycle replacement for graph-based generation of dependency-adherent execution plans for data center migration according to some embodiments.

A next phase of graph reduction performed by the migration planning service 152 is shown in FIG. 4, which is a diagram illustrating a cycle replacement phase 400 of graph reduction for graph-based generation of dependency-adherent execution plans for data center migration according to some embodiments.

In this second phase 400 of graph reduction, the bi-dependency reduced graph 304 may be stepped through to identify cycles. A cycle is a path of edges and nodes wherein a node is reachable from itself. In some embodiments, the cycle replacement phase 400 seeks to identify directed cycles, i.e., a sequence of nodes starting and ending at the same node, with each two consecutive nodes in the sequence adjacent to each other in the graph, and where each edge is traversed by the walk in accordance with the direction of the edge—that is, the edge must be oriented from the earlier of two consecutive nodes to the later of the two nodes in the sequence.

In this example, the walk through the bi-dependency reduced graph 304 may follow a path via nodes A-B-X-E-F-G. At node 'G' 202G, upon (or before) walking the next edge to node 'E' 202E, a directed cycle 402 is detected—i.e., the path visiting nodes E-F-G-E—due to the traversal reaching an already-visited node 'E' 202E.

The existence of a directed cycle 402 indicates that the corresponding computing resources (here, servers) represented by the nodes of the cycle are dependent upon each other, despite no two of the nodes being bi-dependent on each other. Thus, if only one of these resources were to be deployed before the others, the first deployed resource may not be able to properly function due to its need to communicate with other, not-yet deployed resources. Accordingly, in some embodiments, such cyclic dependent resources can be detected and marked, in an eventual execution plan for migration, to be migrated together at a same time or during a same phase.

Accordingly, in some embodiments, each found cycle is replaced with a placeholder node. After the replacement, the graph walk may continue to seek any additional cycles and similarly replace them if found.

For example, upon the detection of the directed cycle 402 in the bi-dependency reduced graph 304 at the top of FIG. 4, the three nodes and three edges of the cycle—i.e., node 'E' 202E, node 'F' 202F, node 'G' 202G, and the edges therebetween—are replaced with placeholder node 'Y' 406Y. At this point, no other cycles exist, resulting in the further-reduced directed graph 404, which includes two "original" nodes 202A-202B (here, directly corresponding to a server) and two placeholder nodes 306X and 406Y.

Figure 5:
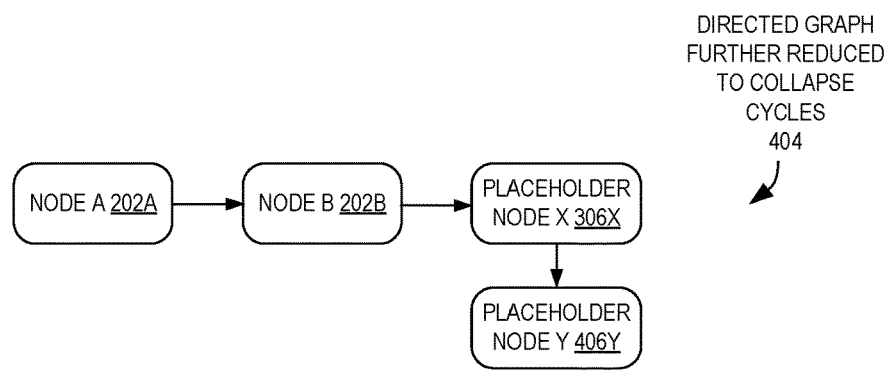
FIG. 5 is a diagram illustrating a topological sort of a reduced graph for graph-based generation of dependency-adherent execution plans for data center migration according to some embodiments.
Figure 5:
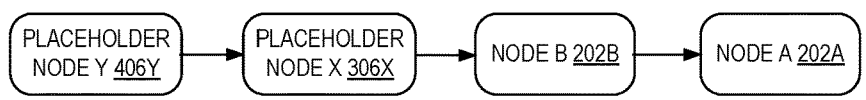

A next phase of graph reduction performed by the migration planning service 152 is shown in FIG. 5, which is a diagram illustrating a phase 500 performing a topological sort of a reduced graph for graph-based generation of dependency-adherent execution plans for data center migration according to some embodiments. As a next phase 500, the reduced graph 404 from FIG. 4 (with any bi-dependent nodes replaced, and with any cycles replaced), as shown at the top of FIG. 5, can be topologically sorted to result in the topologically sorted graph 502.

A topological sort (or "topological ordering") of a directed graph is a linear ordering of its nodes such that for every directed edge uv from node u to node v, node u comes before node v in the ordering.

At this point, the further-reduced directed graph 404 typically will include a plurality of nodes with no cycles, and thus, in some embodiments, the further-reduced directed graph 404 can be referred to as a directed acyclic graph (DAG). It is known that any DAG has at least one topological ordering, and algorithms are known by those of skill in the art for constructing a topological ordering of a DAG in linear time. However, in some edge cases, it is also possible that the further-reduced directed graph 404 is a graph with a single node and no edges. In this edge case, all of the computing resources can be marked, in the execution plan, for migration at once (e.g., in one phase).

As a result of applying a topological sort algorithm to the further-reduced directed graph 404, a topologically sorted graph 502 is created. In this case, the topologically sorted graph 502 begins with placeholder node 'Y' 406Y, proceeds to placeholder node 'X' 306X, proceeds to node 'B' 202B, and proceeds to node 'A' 202A.

Figure 6:
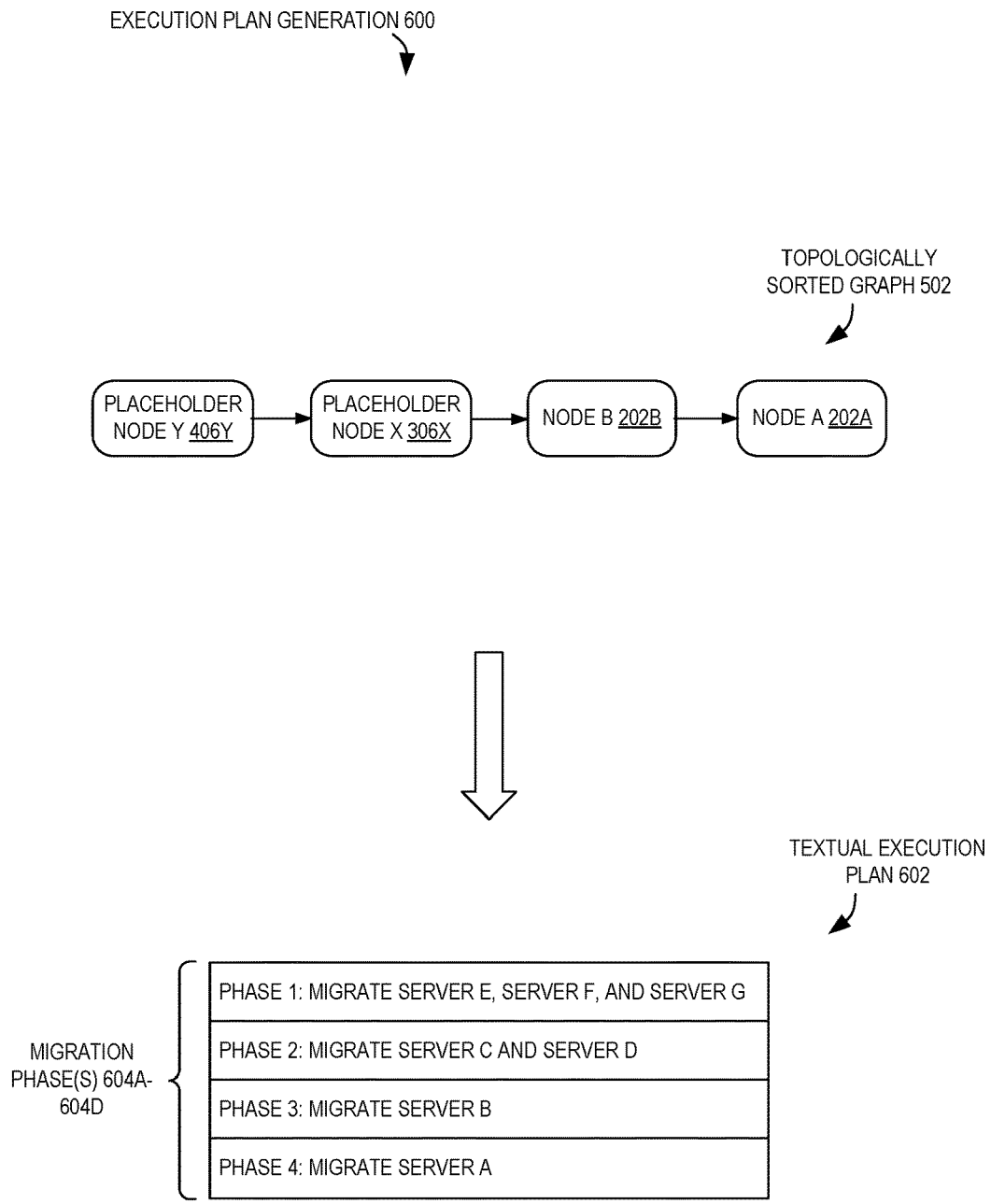
FIG. 6 is a diagram illustrating execution plan generation based on a topologically sorted graph as part of graph-based generation of dependency-adherent execution plans for data center migration according to some embodiments.

At this point, the topologically sorted graph 502 can be used by the migration planning service 152 to generate an execution plan. For example, FIG. 6 is a diagram illustrating execution plan 602 generation based on a topologically sorted graph 502 as part of graph-based generation of dependency-adherent execution plans for data center migration according to some embodiments. In this figure, a "textual" representation of an execution plan 602 is shown for each of human understanding; note that in various embodiments there are many other types and/or formats for execution plans 602 that can be utilized.

The nodes of the topologically sorted graph 502 are ordered in such a manner that computing resources corresponding to later nodes are dependent upon computing resources corresponding to earlier nodes. This special ordering allows for computing resources corresponding to the first node—here, placeholder node 'Y' 406Y—to be migrated first, as the one or more corresponding computing resources (here, a set of three servers: server 'E' 124E, server 'F' 124F, and server 'G' 124G) are not dependent upon any other resources (outside of the set of three servers).

Accordingly, execution plan 602 generation includes, in some embodiments, stepping through the topologically sorted graph 502 from node to node, and generating a migration phase for each node that includes the one or more computing resources associated with the node.

In this case, upon examining the first placeholder node 'Y' 406Y, a first migration phase 604A of an execution plan 602 can be generated to include the computing resource(s) associated with placeholder node 'Y' 406Y—i.e., server 'E' 124E, server 'F' 124F, and server 'G' 124G.

Stepping to a next node—placeholder node 'X' 306X—a second migration phase 604B of the execution plan 602 can be generated to include the computing resource(s) associated with placeholder node 'X' 306X—i.e., server 'C' 124C and server 'D' 124D. Similarly, a third migration phase 604C can be generated for server 'B' 124B (via identifying it as corresponding to node 'B' 202B) and a fourth migration phase 604D can be generated for server 'A' 124A (via identifying it as corresponding to node 'A' 202A).

In some embodiments, this execution plan 602 can be directly provided to a migration orchestration service 154 to be executed (i.e., to cause a migration to be performed), and in some embodiments the execution plan 602 can be provided to a device of a user 116 to allow the user to approve or modify the execution plan 602 and optionally schedule a migration to be performed using the original or modified execution plan 602.

As indicated herein, the example described above utilized servers as the involved computing resources to be migrated, such as a web server, database server, application server, mail server, media server, etc. In some embodiments, additionally or alternatively, other computing resources referred to as "infrastructural resources" (e.g., that support the primary computing resources of an application) may be migrated and thus represented in the graph operations, and could include, for example, a DNS server, a DHCP server, a directory services server, a firewall rule, a routing table entry, a software load balancer, etc.

Figure 7:
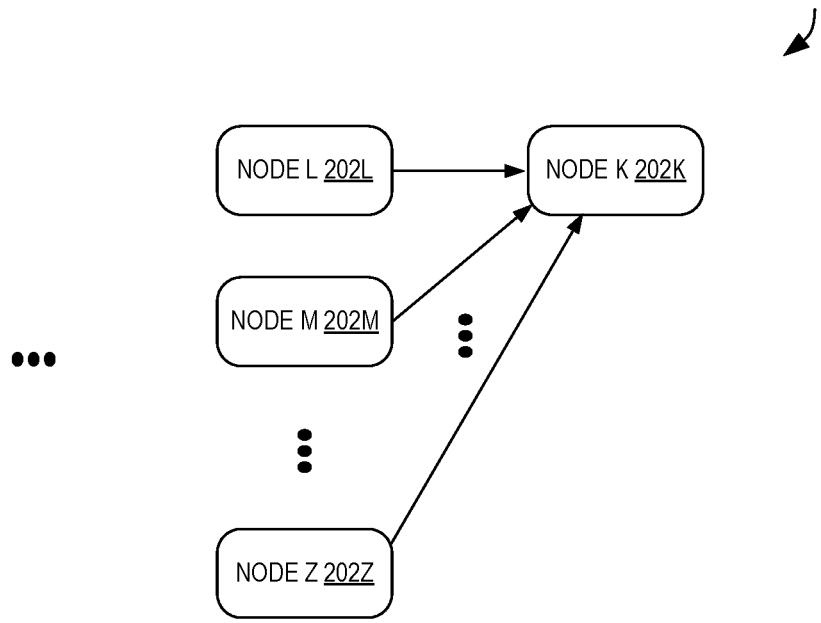
FIG. 7 is a diagram illustrating a partial directed graph corresponding to infrastructural network resources as part of graph-based generation of dependency-adherent execution plans for data center migration according to some embodiments.

In some embodiments, infrastructural resources—such as DNS servers, DHCP servers, directory services servers, etc.—may be included in the common set of resources and thus represented as nodes during the graph-related operations, just as the previously-described servers are. In some cases, these infrastructural resources may end up being migrated in a first phase of a migration execution plan due to how they interoperate with other resources. For example, FIG. 7 is a diagram illustrating a partial directed graph 702 (i.e., a small section of a larger graph) including infrastructural network resources as part of graph-based generation of dependency-adherent execution plans for data center migration according to some embodiments. In this example, node 'K' 202K could be an infrastructural resource such as a DHCP server upon which many other resources depend on (e.g., to assign network addresses for use). Thus, as shown, multiple other nodes 'L'-'Z' 202L-202Z may exist (corresponding to other resources) and all depend upon this node 'K' 202K, leading to a hub-and-spoke configuration. As a result, upon the conclusion of the graph generation, reduction, and topological sorting, a first phase (shown as partial textual execution plan 704) may be generated to move this infrastructural resource.

Further, in some embodiments, there may be many of these types of infrastructural resources, in which potentially large numbers of other resources can be detected as depending upon them, though these infrastructural resources may not rely on any other resources (or perhaps rely on some other infrastructural resources). Thus, in some embodiments the graph generation, reduction, and topological sorting will result in a large first phase where all of these infrastructural resources are migrated, though in other embodiments, such infrastructural resources may be identified and purposefully omitted from the graph-based operations, and instead included in a first phase of an execution plan before other phases are created based on a topologically sorted graph.

Figure 8:
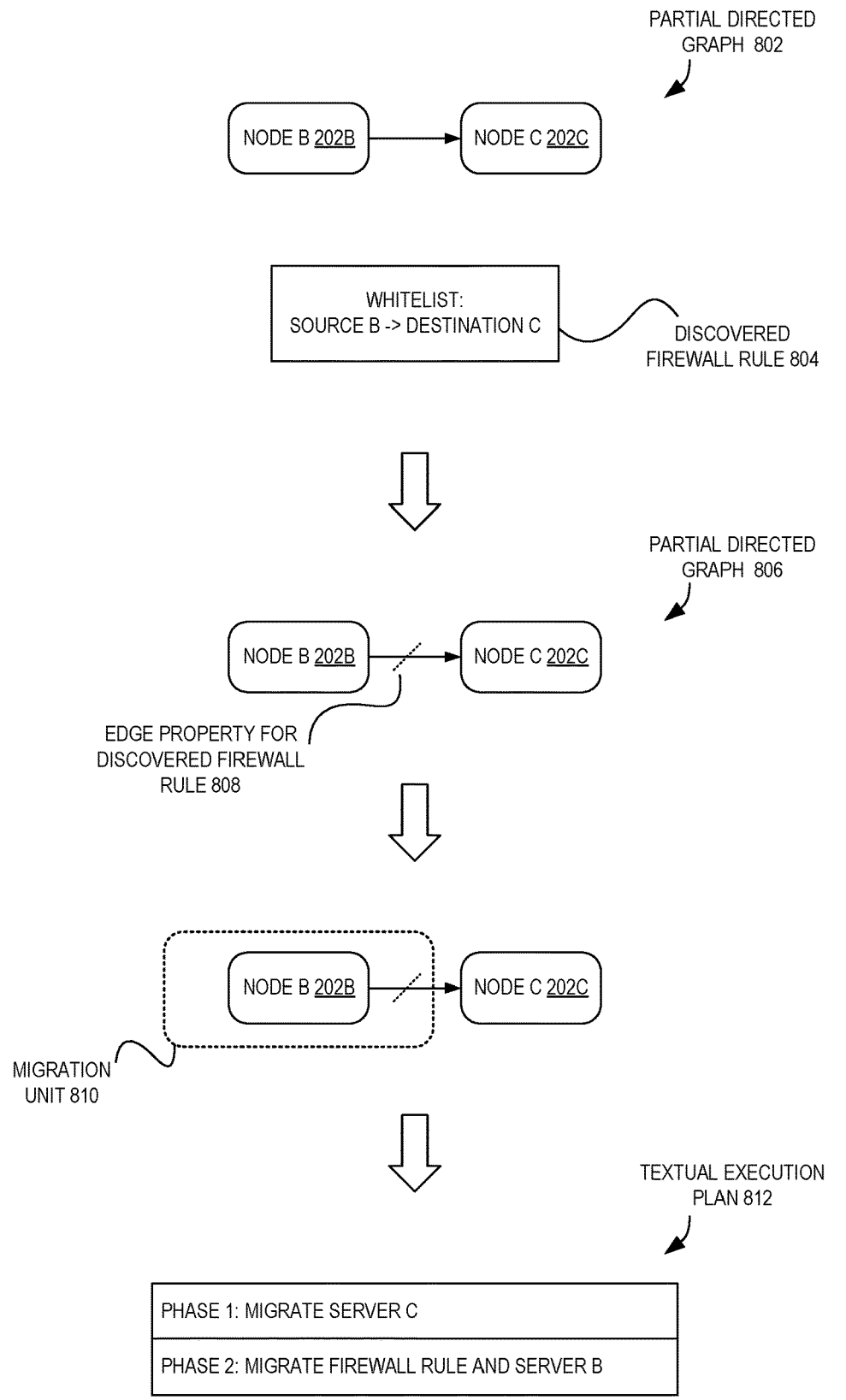
FIG. 8 is a diagram illustrating the use of edge properties as part of graph-based generation of dependency-adherent execution plans for data center migration according to some embodiments.

However, in some embodiments, some infrastructural resources may be migrated and applied within the graph operations in different ways. For example, FIG. 8 is a diagram illustrating the use of edge properties as part of graph-based generation of dependency-adherent execution plans for data center migration according to some embodiments. This diagram illustrates the inclusion of a firewall rule infrastructural resource to be migrated. However, other types of infrastructural resources may exist that can be migrated in a similar manner, including but not limited to public or private network addresses, etc.

A partial directed graph 802 is shown as including a first node 'B' 202B that depends upon node 'C' 202C. Additionally, the discovery data 130A-130B indicates that a firewall rule 804 exists between the resources corresponding to these nodes—here, this firewall rule indicates that there is a whitelist of traffic originating from a resource 'B' and destined to resource 'C' (and thus, resource 'B' depends upon resource 'C', which is reflected in the partial directed graph 802 as the unidirectional edge).

In some embodiments, this infrastructural resource (here, a firewall rule) can be represented in the graph as an edge property 808. Thus, during the operations for translating a topologically sorted graph into an execution plan, the edge property 808 may be migrated with the resource(s) corresponding to one of the two nodes 202B-202C. For example, a firewall rule can be transformed by the migration service into one or more security rules (or "security group" rules) that can be stored by the provider network and then "attached" to an associated compute instance (e.g., upon it being launched). As another example, a public or private network address can be migrated by, for example, creating a virtual network interface in the provider network with the involved network address and attaching the virtual network interface to an associated compute instance (e.g., upon it being launched).

For example, as shown in FIG. 8, the edge property 808 and node 'B' 202B may be combined into a single migration unit 810 and thus, the corresponding resources will be migrated together by being placed into a single phase (here, "phase 2") of the execution plan 812. In this case, within that single phase, the resources associated with the edge property (i.e., the firewall rule) may be migrated first, resulting in the firewall rule 804 (allowing for network communications) being in place before the resource (here, server 'B') associated with the node, thus eliminating any time in which the resource is placed but does not have communications enabled due to a brief non-existence of the firewall rule 804 in the target environment. Alternatively, in some embodiments, the edge property 808 resources could instead be migrated with the node 'C' 202C resources; in this case, the ordering is not important, as the resources corresponding to node 'C' 202C do not depend upon the existence of the infrastructural resource (firewall rule).

Figure 9:
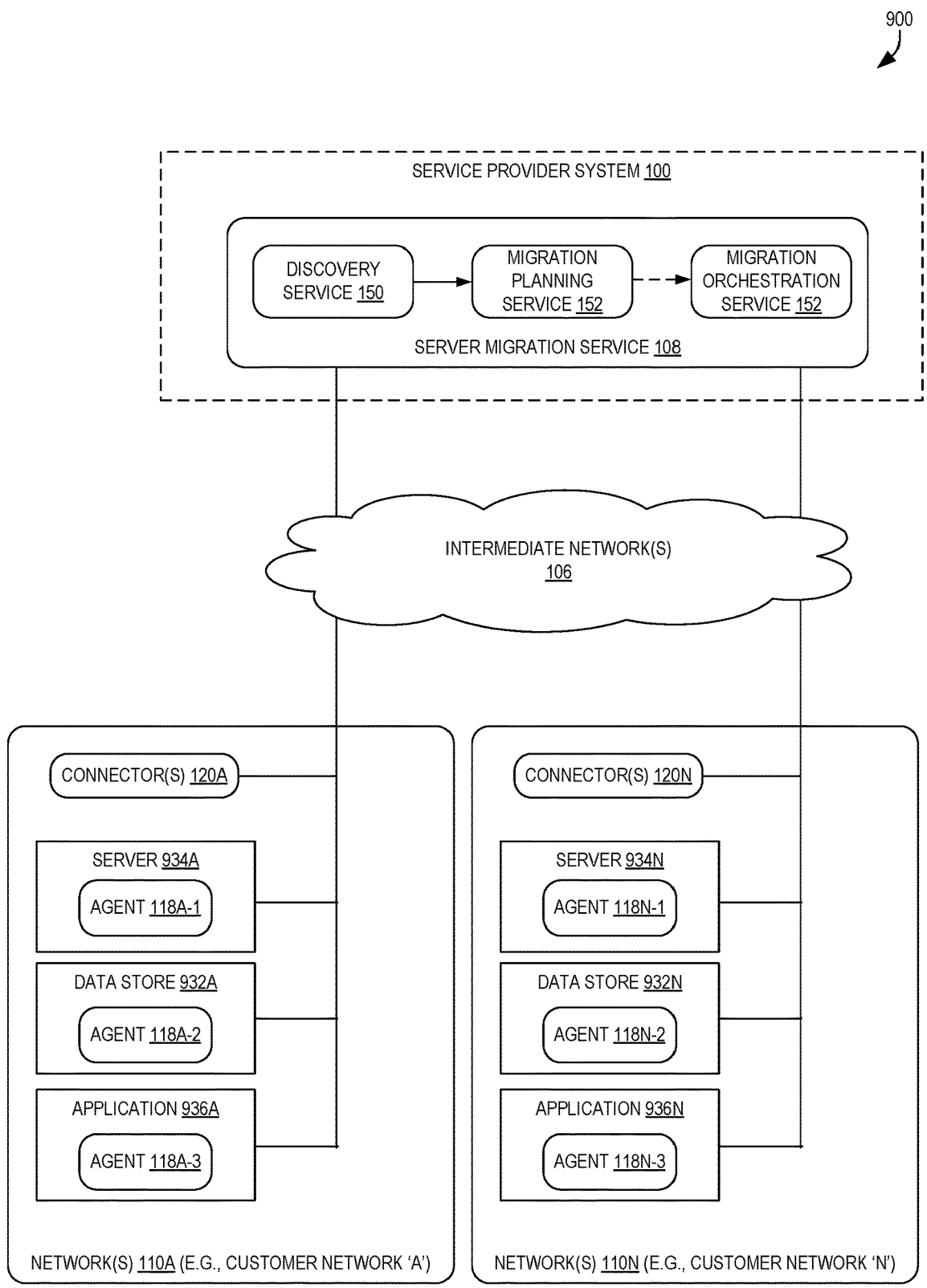
FIG. 9 is a diagram illustrating an example environment including agents deployed at multiple networks as part of graph-based generation of dependency-adherent execution plans for data center migration according to some embodiments.

Embodiments can be utilized in a variety of computing environments. As one example, FIG. 9 is a diagram illustrating an example environment 900 including agents deployed at multiple networks as part of graph-based generation of dependency-adherent execution plans for data center migration according to some embodiments.

The illustrated environment depicts two customer networks 'A' 110A and 'N' 110N out of numerous possible networks. In some embodiments, the networks 110A-110N may be distributed networks of a same single enterprise while in other embodiments, the networks may be enterprise networks for distinct enterprises or various combinations thereof.

Customer network 110A is depicted with datastore 932A and a corresponding discovery agent 118A-2, server 934A and a corresponding discovery agent 118A-1, application 936A and a corresponding agent 118A-3, as well as a discovery connector 120A. A local network (e.g., an enterprise wide area network (WAN), local area network (LAN), or other network) links the datastore 932A, server 934A, and application 936A to one another as well as to an intermediate network 106 (e.g., the Internet). Logical connections between the discovery connector(s) 120 and the datastore 932A, server 934A, and/or application 936A may also exist. In some embodiments, the local network may also link the discovery connector 120 with the datastore 932A, server 934A, and application 936A and/or the corresponding agents 118A. Generally, the configuration of customer networks and network resources (e.g., connector(s) 120A and/or agents 118A) of that network may be referred to as a client network-based resource configuration.

Figure 10:
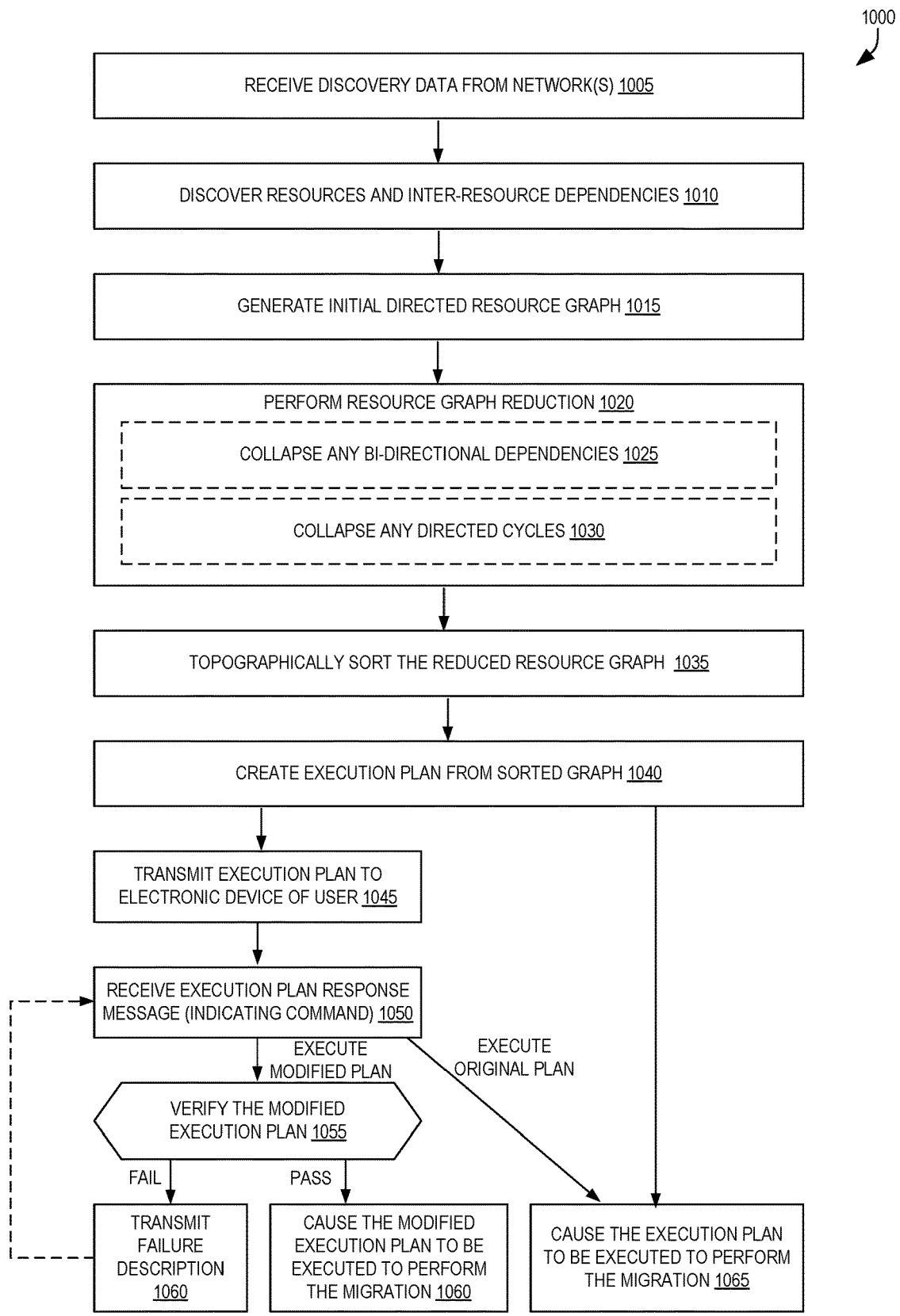
FIG. 10 is a flow diagram illustrating operations for graph-based generation of dependency-adherent execution plans for data center migration according to some embodiments.

FIG. 10 is a flow diagram illustrating operations 1000 for graph-based generation of dependency-adherent execution plans for data center migration according to some embodiments.

Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by the server migration service 108 of the other figures.

In some embodiments, the operations 1000 include, at block 1005, receiving discovery data from one or more network(s). In some embodiments, block 1005 is performed by the discovery service 150 of FIG. 1. The discovery data may be provided by one or more agents deployed within the one or more networks, and/or may be provided by one or more connectors deployed within the one or more networks. The discovery data, in some embodiments, describes or is based on network traffic directly or indirectly observed by the one or more agents that was sent between a plurality of resources in the customer network.

The operations 1000 include, at block 1010, discovering resources and inter-resource dependencies from the discovery data. In some embodiments, block 1010 is performed by the discovery service 150 of FIG. 1. In some embodiments, the discovery includes identifying a list of VMs in the discovery data, identifying one or more servers identified in the data, identifying one or more applications identified in the data, etc. In some embodiments, determining the inter-resource dependencies includes identifying which of the resources sent network traffic that is an opening of a connection or communication session with a recipient resource. In some embodiments, determining the inter-resource dependencies includes analyzing firewall rules to identify pairs of resources that are expected to communicate using network traffic, and/or identifying which of resources of the pairs are expected to be a source of the network traffic.

The operations 1000 also include, at block 1015, generating initial directed resource graph. In some embodiments, block 1015 is performed by the migration planning service 152 of FIG. 1, and can include creating a node data structure for one or more of the resources discovered in block 1010, and can include creating edges between pairs of the nodes corresponding to resources that have at least one discovered dependency between the two. In some embodiments, the edges can be directed edges that indicate either a unidirectional dependence between the two resources and/or a bidirectional dependence between the two resources.

The operations 1000 also include, at block 1020, perform resource graph reduction. In some embodiments, block 1020 is performed by the migration planning service 152 of FIG. 1, and may include replacing any bi-directional dependencies at block 1025 and replacing any directed cycles at block 1030. In some embodiments, block 1020 includes walking through the resource graph data structure one or more times to identify bidirectional edges and/or cycles. In the case of an identified bidirectional edge between two nodes, block 1025 may include replacing these nodes and the edge with a placeholder node. In the case of an identified cycle involving three or more nodes connected with three or more edges, block 1030 may include replacing these three or more nodes and three or more edges with a placeholder node.

The operations 1000 also include, at block 1035, topographically sorting the reduced resource graph. In some embodiments, block 1035 is performed by the migration planning service 152 of FIG. 1. In some embodiments, the reduced resource graph is a directed acyclic graph (DAG), and in some embodiments the topographical sort utilizes an algorithm that can perform in linear time. In some embodiments, the algorithm may comprise, or be a modified version of, Kahn's algorithm, or may include reversing a postorder numbering of a depth-first search graph traversal.

At block 1040, the operations 1000 include creating an execution plan from the sorted graph. In some embodiments, block 1040 is performed by the migration planning service 152 of FIG. 1. In some embodiments, the sorted graph is traversed, and for each node visited, the one or resources corresponding to the node are inserted into their own migration phase of the execution plan. In some embodiments, resources associated with an edge property of the edge attached to the node may also be included in that phase of the execution plan.

Optionally, in some embodiments, the operations 1000 next include block 1070, and causing the execution plan to be executed to perform the migration. In some embodiments, block 1070 is performed by the migration orchestration service 154 of FIG. 1. In some embodiments, block 1070 includes calling into a set of execution services such as a disk replication component, a VM import component, a database replication component, etc., which may carry out the execution plan to perform the migration. The migration may be from a first network (e.g., of a customer, or within the service provider system) into the service provider system 100, or into another service provider system or network. In some embodiments, during the migration or when migration is complete, a migration validation service may validate the migration.

However, in some embodiments, the operations 1000 also include, at block 1045, transmitting the execution plan to an electronic device of user. In some embodiments, block 1045 is performed by the migration orchestration service 154 of FIG. 1, though in some embodiments block 1045 is performed by one or more interfaces 104, an entity of the control plane 103, etc. The transmission may occur responsive to a request (e.g., a HyperText Transport Protocol (HTTP) request issued to an API endpoint) issued by the electronic device indicating a request for the execution plan. In some embodiments, the execution plan is thereafter presented to a user for review, and the user may confirm the execution plan as it stands or modify the execution plan and instruct the server migration service 108 to execute either the original or modified execution plan.

Thus, in some embodiments, the operations 1000 include, at block 1050, receiving an execution plan response message, which may indicate a command In some embodiments, block 1045 is performed by the migration orchestration service 154 of FIG. 1, though in some embodiments block 1045 is performed by one or more interfaces 104, an entity of the control plane 103, etc. The command may indicate that the original execution plan is to be followed to perform the migration, and may further indicate a schedule upon which the migration is to occur. The command may indicate that the modified execution plan (optionally included within the execution plan response message, or sent via another message) is to be followed to perform the migration, and may further indicate a schedule upon which the migration is to occur.

When the command indicates that the original execution plan is to be followed to perform the migration, the operations 1000 then include block 1070. However, when the command indicates that the modified execution plan is to be used, the operations 1000 may optionally proceed to block 1055, and verifying the modified execution plan (e.g., by the migration orchestration service 154 to ensure that it is syntactically correct, doesn't create serious problems, involves proper resources, etc.).

In some embodiments, the command may indicate a request to split the migration into multiple steps, and may indicate phases of the execution plan that are to be separated. For example, a first and second phase may be initially performed, while a third and fourth phase of the original plan may be temporarily or indefinitely put on hold.

In some embodiments, the command may indicate that the server migration service is to split the execution into separate parts. The command may indicate a particular number of parts, though not specify how to do the separation. In some embodiments, the migration orchestration service 154 may split the execution plan into separate parts, for example, by commanding the migration planning service 152 to split one or more of the graphs (e.g., initial, reduced, and/or topologically sorted) a number of times. The migration planning service 152 could use, for example, an edge cutting algorithm known (e.g., a minimum cut algorithm such as the Edmonds-Karp algorithm, a maximum cut algorithm, a sparsecut algorithm, etc.) to those of skill in the art to identifying one or more locations within the graph where edges are to be removed, to thus create multiple stages of the execution plan.

When the verification succeeds, or in embodiments where block 1055 is not included, the operations may include block 1065 and causing the modified execution plan to be executed to perform the migration, which may occur according to a schedule. In some embodiments, block 1065 is performed by the migration orchestration service 154 of FIG. 1.

However, if the verification at block 1055 does not succeed (i.e., it fails), the operations 1000 may include, at block 1060, transmitting a failure or warning notification. In some embodiments, block 1060 is performed by the migration orchestration service 154 of FIG. 1, though in some embodiments block 1045 is performed by one or more interfaces 104, an entity of the control plane 103, etc. The failure or warning notification may indicate a nature of the failure of the verification, and may be sent to the electronic device of the user, to a messaging account/mailbox (e.g., to an email address), etc. At this point, the flow of the operations 1000 may continue back to block 1050, etc.

In some embodiments, the migration is performed from a first network that is distinct from a service provider system into the service provider system or "provider network," and may include launching compute instances of a hardware virtualization service, storing data in a storage virtualization service, etc.

Figure 11:
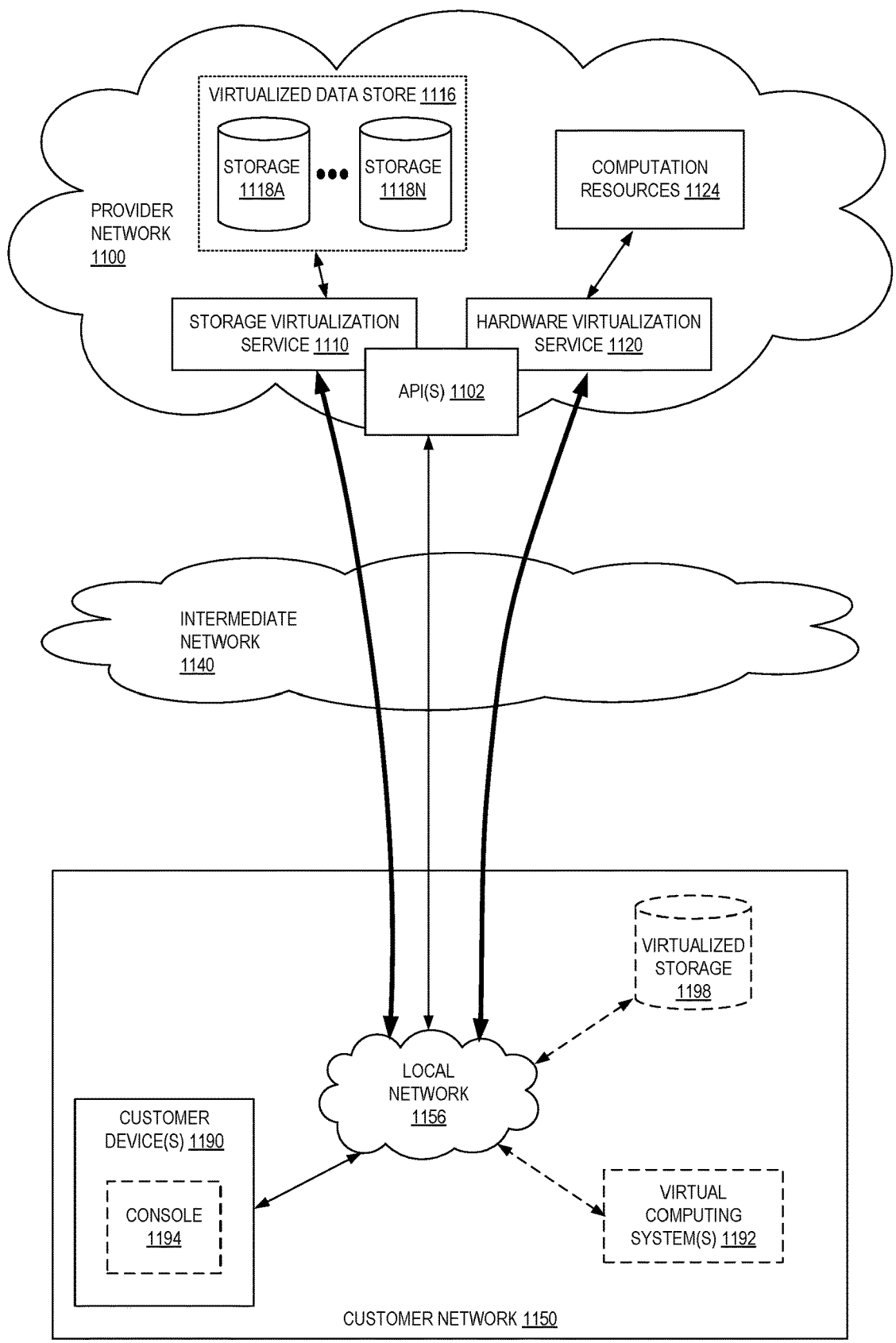
FIG. 11 is a block diagram of an example service provider network that provides a storage virtualization service and a hardware virtualization service to customers according to some embodiments.

FIG. 11 is a block diagram of an example provider network that provides a storage virtualization service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage virtualization service 1110, for example via one or more APIs 1102, to access data from and store data to storage 1118A-1118N of a virtual data store 1116 provided by the provider network 1100. In some embodiments, a virtualized data store gateway (not shown) may be provided at the customer network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
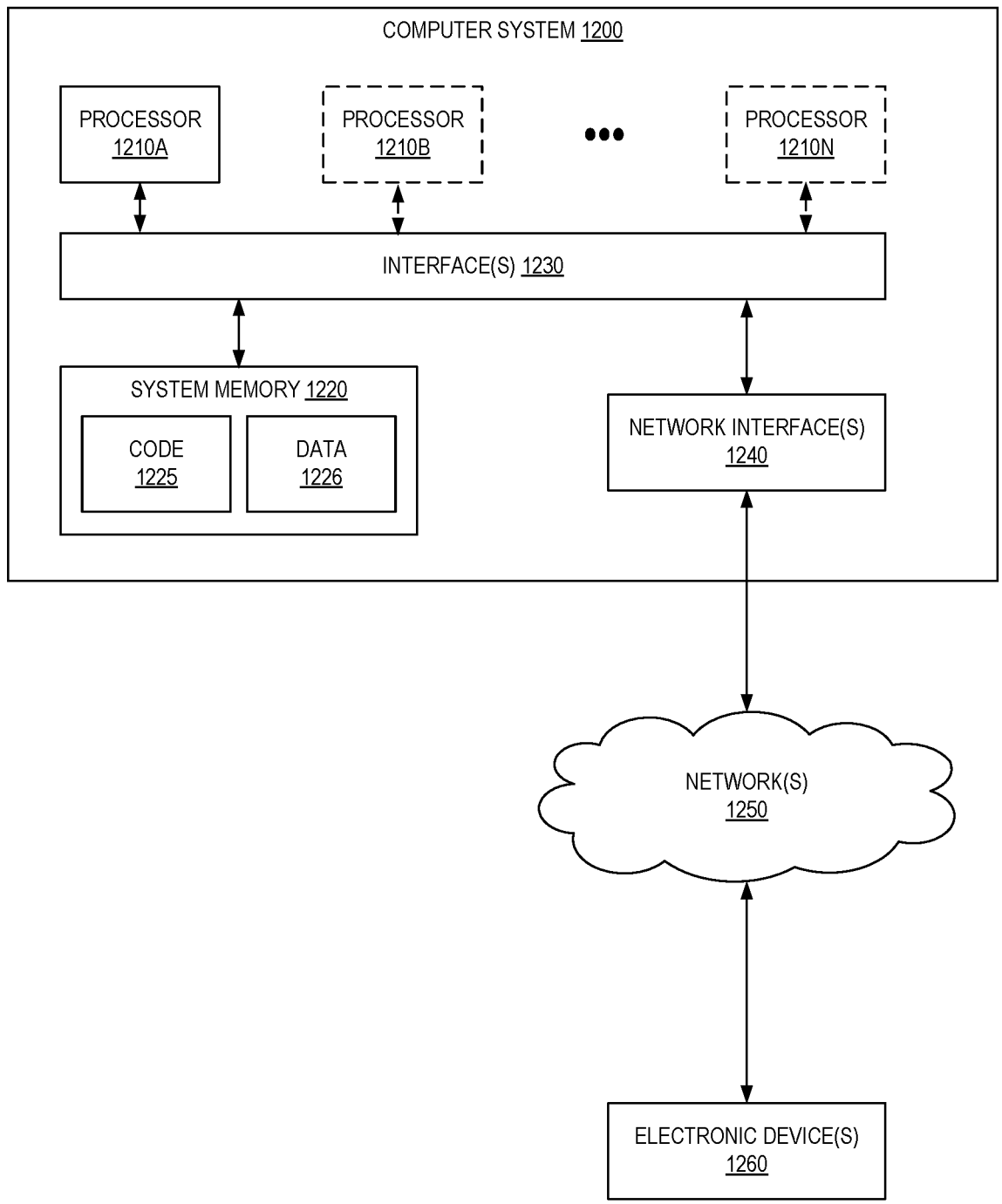
FIG. 12 is a block diagram illustrating an example computer system that may be used in some embodiments.

In some embodiments, a system that implements a portion or all of the techniques for graph-based generation of dependency-adherent execution plans for data center migrations as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 1220 may be one embodiment of a computer-accessible medium configured to store program instructions and data for implementing a server migration service in a provider network environment. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments may further include receiving, sending, or storing instructions and/or data implemented in accordance with the foregoing description upon a computer-accessible medium. A computer-accessible medium may include storage media or memory media such as magnetic or optical media, e.g., disk or DVD/CD-ROM (digital video disk/compact disk read-only memory), volatile or non-volatile media such as RAM (e.g. SDRAM, DDR, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 108A-108Z, 124A-124F) may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary.

Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The various methods as illustrated in the figures and described herein represent exemplary embodiments of methods. The methods may be implemented in software, hardware, or a combination thereof. The order of the methods may be changed, and various elements may be added, reordered, combined, omitted, modified, etc. Thus, various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method comprising:
   generating a sorted graph data structure based at least in part on discovery data received from one or more agents executing in a first network, wherein the discovery data describes or is based on network traffic directly or indirectly observed by the one or more agents in the first network, wherein the generating includes:
      generating a directed graph data structure comprising a plurality of nodes corresponding to a plurality of resources in the first network and further comprising a plurality of directed edges each indicating a unidirectional or bidirectional dependency between the nodes that the edge connects,
      reducing the directed graph data structure by eliminating, from the directed graph data structure, any bidirectional dependency or directed cycle that exists to yield a reduced graph data structure, wherein the reducing includes replacing, in the directed graph data structure, at least two of the plurality of nodes and at least one edge with a single node, and
      topologically sorting the reduced graph data structure to yield the sorted graph data structure; and
   generating, based at least in part on the sorted graph data structure, an execution plan for a migration of the plurality of resources from the first network to a second network.

2. The computer-implemented method of claim 1, further comprising:
   transmitting, to an electronic device, the execution plan;
   receiving a message indicating that the migration is to be performed following the execution plan according to a schedule; and
   performing the migration of the plurality of resources from the first network to the second network as indicated by the schedule.

3. The computer-implemented method of claim 1, wherein generating the directed graph data structure includes:
   determining, using the discovery data, that a first resource of the plurality of resources initiated a communication with a second resource of the plurality of resources; and
   inserting, into the directed graph data structure, a first node for the first resource, a second node for the second resource, and a unidirectional directed edge between the first node and the second node.

4. The computer-implemented method of claim 3, wherein generating the directed graph data structure further includes:
   determining, using the discovery data, that a third resource of the plurality of resources initiated a communication with a fourth resource of the plurality of resources;
   determining, using the discovery data, that the fourth resource initiated a communication with the third resource; and
   inserting, into the directed graph data structure, a third node for the third resource, a fourth node for the fourth resource, and a bidirectional directed edge between the third node and the fourth node.

5. The computer-implemented method of claim 3, wherein generating the directed graph data structure further includes:
   assigning, to the unidirectional directed edge or to the first node, a property indicating that an infrastructural resource is to be migrated along with the first resource.

6. The computer-implemented method of claim 1, wherein reducing the directed graph data structure further comprises:
   identifying one or more directed edges of the plurality of directed edges to be removed from the directed graph data structure; and
   removing the one or more directed edges to yield the reduced graph data structure and one or more other reduced graph data structures.

7. The computer-implemented method of claim 1, wherein the plurality of resources includes one or more software applications comprising one or more of:
   a web server;
   a database server;
   an application server;
   a mail server; or
   a media server.

8. The computer-implemented method of claim 7, wherein the plurality of resources further include one or more infrastructural resources comprising one or more of:
   a domain name system (DNS) server;
   a dynamic host configuration protocol (DHCP) server;
   a directory services server;
   a firewall rule;
   a routing table entry; or
   a software load balancer.

9. The computer-implemented method of claim 1, wherein the execution plan includes a plurality of migration phases, wherein each of the plurality of migration phases identifies at least one of the plurality of resources to be migrated.

10. The computer-implemented method of claim 1, wherein:
   the first network comprises a customer network and the second network comprises a service provider system, wherein the customer network is distinct from the service provider system;
   the first network comprises a first service provider system and the second network comprises a second service provider system; or the first network is located within a first region of the service provider system and the second network is located within a second region of the service provider system.

11. A computer-implemented method comprising:
receiving, over one or more networks, discovery data from one or more agents located within a customer network, wherein the discovery data describes or is based on network traffic directly or indirectly observed by the one or more agents that was sent between a plurality of resources in the customer network;
determining, based on an analysis of the discovery data, dependencies between ones of the plurality of resources;
generating a directed graph data structure comprising a plurality of nodes corresponding to the plurality of resources and further comprising a plurality of directed edges each indicating a unidirectional or bidirectional dependency between the nodes that the edge connects;
reducing the directed graph data structure by eliminating, from the directed graph data structure, a directed cycle to yield a reduced graph data structure, wherein the reducing comprises:
iterating through at least some of the plurality of nodes of the directed graph data structure to identify a directed cycle comprising at least two nodes and at least two edges; and
replacing, in the directed graph data structure, the at least two nodes and the at least two edges with a single node;
topologically sorting the reduced graph data structure to yield a sorted graph data structure;
generating, based at least in part on the sorted graph data structure, an execution plan for a migration of the plurality of resources from the customer network to a service provider system, wherein the generating includes designating at least two resources that correspond to the at least two nodes to be migrated at a same phase of the migration; and
transmitting, to an electronic device, the execution plan.

12. The computer-implemented method of claim 11, further comprising:
receiving, from the electronic device, a message indicating that the migration is to be performed following the execution plan according to a schedule; and
performing the migration of the plurality of resources from the customer network to the service provider system as indicated by the schedule.

13. A system comprising:
one or more agents implemented by a first one or more electronic devices within a first network, wherein the one or more agents are to directly or indirectly observe network traffic sent between a plurality of resources in the first network and are to send discovery data that describes or is based on the network traffic; and
a server migration service implemented by a second one or more electronic devices, the server migration service comprising instructions which, when executed by the second one or more electronic devices, cause the server migration service to:
generate a sorted graph data structure based at least in part on discovery data received from the one or more agents, wherein the discovery data describes or is based on network traffic observed by the one or more agents in the first network, wherein the server migration service, to generate the sorted graph data structure, is to:
generate a directed graph data structure comprising a plurality of nodes corresponding to the plurality of resources in the first network, and
reduce the directed graph data structure by eliminating, from the directed graph data structure, any bidirectional dependency or directed cycle that exists to yield a reduced graph data structure, wherein the eliminating includes replacing, in the directed graph data structure, at least two of the plurality of nodes and at least one edge with a single node; and
generate, based at least in part on the sorted graph data structure, an execution plan for a migration of the plurality of resources from the first network to a second network.

14. The system of claim 13, wherein the instructions, when executed by the second one or more electronic devices, further cause the server migration service to:
receive, from an electronic device, a message indicating that the migration is to be performed following the execution plan according to a schedule; and
perform the migration of the plurality of resources from the first network to the second network as indicated by the schedule.

15. The system of claim 13, wherein the server migration service, to generate the directed graph data structure, is to:
determine, using the discovery data, that a first resource of the plurality of resources initiated a communication with a second resource of the plurality of resources; and
insert, into the directed graph data structure, a first node for the first resource, a second node for the second resource, and a unidirectional directed edge between the first node and the second node.

16. The system of claim 15, wherein the server migration service, to generate the directed graph data structure, is further to:
determine, using the discovery data, that a third resource of the plurality of resources initiated a communication with a fourth resource of the plurality of resources;
determine, using the discovery data, that the fourth resource initiated a communication with the third resource; and
insert, into the directed graph data structure, a third node for the third resource, a fourth node for the fourth resource, and a bidirectional directed edge between the third node and the fourth node.

17. The system of claim 15, wherein the server migration service, to generate the directed graph data structure, is to:
assign, to the unidirectional directed edge or to the first node, a property indicating that an infrastructural resource is to be migrated along with the first resource.

18. The system of claim 13, wherein the server migration service, to reduce the directed graph data structure, is to further:
identify one or more directed edges of the plurality of directed edges to be removed from the directed graph data structure; and
remove the one or more directed edges to yield the reduced graph data structure and one or more other reduced graph data structures.

19. The system of claim 13, wherein the plurality of resources includes one or more software applications comprising one or more of:

a web server;
a database server;
an application server;
a mail server; or
a media server.

* * * * *